Figure 1:
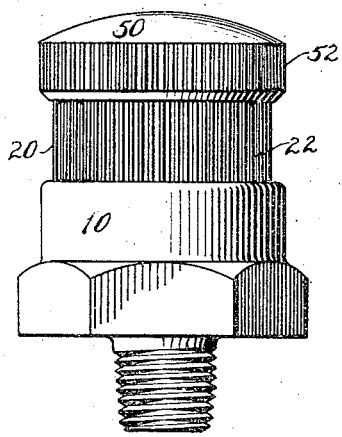

O. ZERK.
GREASE CUP.
APPLICATION FILED APR. 4, 1913.

1,100,814.

Patented June 23, 1914.

WITNESSES:
Justin W Machlin
R L Buck

INVENTOR.
Oscar Zerk
BY Albert H Bates
ATT'Y

UNITED STATES PATENT OFFICE.

OSCAR ZERK, OF CLEVELAND, OHIO, ASSIGNOR, BY MESNE ASSIGNMENTS, TO GEORGE W. BOWEN, OF AUBURN, NEW YORK.

GREASE-CUP.

1,100,814. Specification of Letters Patent. Patented June 23, 1914.

Application filed April 4, 1913. Serial No. 758,822.

*To all whom it may concern:*

Be it known that I, OSCAR ZERK, a subject of the Emperor of Austria-Hungary, residing at Cleveland, in the county of Cuyahoga and State of Ohio, have invented a certain new and useful Improvement in Grease-Cups, of which the following is a full, clear, and exact description, reference being had to the accompanying drawings.

This invention relates to grease cups of the type wherein there is movable plunger within a normally stationary body, the plunger being moved to force the grease by the turning of an exterior rotatable handle.

The object of the invention is to enable such form of grease cup to be made extremely compact and without any projecting portion like the wing or head on the thumb screw, as now frequently employed in grease cups. To this end I have provided a grease cup having a cup portion or member, a cap member detachably connected thereto as by screw threads and normally stationary in service, a plunger within the cap, a screw rotatably mounted in the cap and adapted to progress the plunger, and a head for the screw, itself in the form of a cap, which lies closely over the end wall of the main cap and is flanged downwardly around the upper end of the outer side thereof. The main cap and the operating cap are each knurled on its exterior, enabling them to be independently turned, the one to open or close the grease cup, and the other to feed the grease therein.

The invention is clearly illustrated in the drawing herein.

Figure 2:
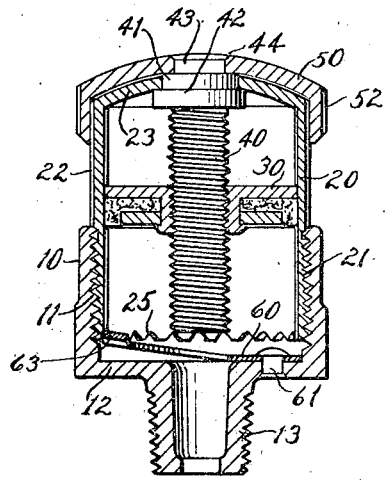
Figure 3:
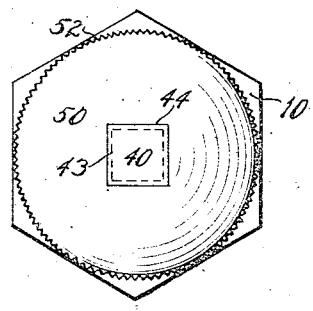
Figure 4:
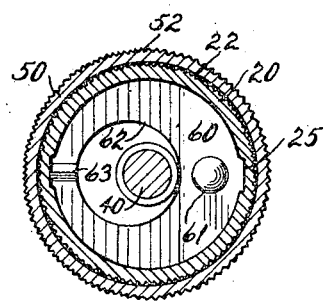

Figure 1 is a side elevation of my grease cup complete; Fig. 2 is a vertical central section thereof; Fig. 3 is a plan; Fig. 4 is a cross section through the grease cup.

Referring by numerals to the parts shown in the drawings, 10 represents the base member or cup portion of my grease cup. This is shown as having a wall with internal screw threads 11, a bottom portion 12, and an externally threaded nipple 13 connected with the bottom portion and having a bore communicating with the chamber within the wall.

20 represents the cap member or main cup of the structure consisting of an inverted cup-like member having external threads 21 in the lower portion of the wall of its open end which screw into the threads 11. Above the threaded portion, the exterior of the wall is knurled, preferably by up and down ribs and grooves 22. The top portion of the cup 20 is preferably crown-shaped or spherical, as shown at 23. In use this main cap is held firmly within the wall of the cup. Within the cup 20 is a plunger 30 guided by one or more grooves 25 in the wall of the cup and provided with a central internal thread. Occupying this thread is the screw 40, which is rotatably journaled in the crown of the cup.

41 indicates the journal bearing and 42 a collar integral or rigid with the screw below the crown of the cap 20 and engaging the inner surface of the closed end of said cap 20. When the screw is rotated in the proper direction the plunger is forced downward to feed the grease.

To provide simple, compact and attractive means for externally rotating the screw, I provide the auxiliary or operating cap 50. This is crown-shaped to seat over the cap 20 and has a cylindrical wall lying closely outside of the upper end of the corresponding wall of the cap 20 and terminating above the threaded side wall of the base member to expose a portion of the knurled side wall of the main cap member 20 to permit turning of said cap member. The supplemental cap is rigidly secured to the screw 40, preferably by an extension 43 of the screw which is passed through and seated in the spherical end wall of the supplemental cap and is peened or riveted over at its upper edge, being thus provided with a shoulder 44 which engages the outer surface of said end wall. This riveting is countersunk to make its top flush with the crown of the supplemental cap. The screw 40 thus permanently unites the end walls of the caps 20 and 50, and as will be obvious to those skilled in the art, both of said caps and the plunger 30 and the screw 40 are removable as a whole from the base member 10. The supplemental cap is knurled on its cylindrical wall, preferably by vertical ribs and grooves, as shown at 52.

My grease cup is separated for filling in the usual manner by the operator grasping with his fingers the knurled portion 22 of the cap member 20 beneath the cylindrical wall of the cap 50 and unscrewing it from the base member 10. When the filled cap is returned, grease is fed as desired by the rotation of the screw by means of the supplemental cap 50, the knurling on this cap furnishing effective means for rotating it.

Any suitable locking device may be employed to hold the main cap effectively in the cup. As shown, I have provided a device which is the subject of my application Sr. No. 758,552 filed April 3, 1913 and is claimed therein. This device, as shown herein, consists of a spring washer 60 secured by a rivet 61 to the bottom 12 of the cup, this washer having an opening 62 through which the grease passes and having on the opposite side of the opening from its point of fastening an upward projection 63. The lower edge of the cap is provided with notches 25 with which this projection may coöperate to prevent the cap being displaced.

Having thus described my invention, what I claim is:

1. In a grease cup, the combination with a base member and a cup-shaped cap member detachably connected together; of an operating cap inclosing the closed end of the cap member and rotatable relatively thereto, the outer surface of the operating cap being of less area than the outer surface of the cap member for exposing a portion of the last-mentioned outer surface to permit engagement thereof, and feeding means within the cap member controlled by the rotation of the operating cap, the feeding means being removable with the cap member when the latter is detached from the base member, substantially as and for the purpose described.

2. In a grease cup, the combination with a base member and a cap member having end and side walls; of an operating cap inclosing end and side surfaces of the cap member and rotatable relatively thereto, the operating cap being permanently connected to the cap member, the operating cap having an end, and a side wall of less height than the side wall of the cap member for exposing a portion of the last-mentioned side wall to permit engagement thereof, and feeding means within the cap member controlled by the rotation of the operating cap, substantially as and for the purpose specified.

3. In a grease cup, the combination with a base member; of two caps, each provided with an end wall and a side wall, the end walls being arranged one above the other, and the side walls being arranged one within the other, the inner side wall being of greater height than the outer side wall and projecting beyond said outer side wall and detachably engaging the base member, the outer side wall and the projecting portion of the inner side wall being provided with hand engaging surfaces, and feeding means within the cap provided with the inner side wall and controlled by the rotation of the cap provided with the outer side wall, substantially as and for the purpose set forth.

4. In a grease cup, the combination with a base member; of two caps, each provided with a crowning end wall and with a side wall having a knurled periphery, the end walls being arranged one above the other, and the side walls being arranged one within the other, the inner side wall being of greater height than the outer side wall and having its open end projecting beyond said outer side wall and detachably engaging the base member, and opposing surfaces of said caps fitting each other, and feeding means within the cap provided with the inner side wall and controlled by the rotation of the cap provided with the outer side wall, substantially as and for the purpose described.

5. In a grease cup, the combination with a base member; of two caps, each provided with an end wall and a side wall, the end walls being arranged one above the other, and the side walls being arranged one within the other, the inner side wall being of greater height than the outer side wall and projecting beyond said outer side wall and detachably engaging the base member, the outer side wall and the projecting portion of the inner side wall being provided with hand engaging surfaces, and feeding means within the cap provided with the inner side wall and controlled by the rotation of the cap provided with the outer side wall, said feeding means including a member uniting the end walls of the caps, substantially as and for the purpose specified.

6. In a grease cup, the combination with a base member and a cup-shaped cap member detachably connected together; of an operating cap inclosing the closed end of the cap member and rotatable relatively thereto, the outer surface of the operating cap being of less area than the outer surface of the cap member for exposing a portion of the last-mentioned outer surface to permit engagement thereof, an axially movable plunger within the cap member, and a stem journaled in the end wall of the cap member and fixed to the operating cap and connected to the plunger for moving the same axially, substantially as and for the purpose set forth.

7. In a grease cup, the combination with a base member; of two caps, each provided with a crowning end wall and with a side wall having a knurled periphery, the end walls being arranged one above the other, and the side walls being arranged one within the other, the inner side wall being of greater height than the outer side wall and having its open end projecting beyond said outer side wall and detachably engaging the base member, and opposing surfaces of said caps fitting each other, and axially movable plunger within the cap provided with the inner side wall, and a stem fixed to the cap provided with the outer side wall and journaled in the end wall of the other cap and connected to the plunger for moving the same axially, substantially as and for the purpose described.

8. In a grease cup and in combination, a base member, a cup-shaped cap member revoluble relatively to the base member, means for holding the base and cap members from relative movement, a plunger movable within the cap member, a spindle journaled in the closed end of the cap member, and an operating cap fixed to the spindle and journaled on the upper end of the cap member, a portion of the wall of the cap member being exposed beneath the operating cap, substantially as and for the purpose specified.

9. In a grease cup and in combination, a base member, a cup-shaped cap member revoluble relatively to the base member and formed with a spherical end wall, means for holding the base and cap members from relative movement, a plunger movable within the cap member, and a spindle journaled in the end wall of the cap member and having a shoulder engaging the inner face of the cap member, and a second shoulder of spherical form turning upon the contiguous surface of said end wall of the cap member, substantially as and for the purpose set forth.

10. In a grease cup and in combination, a base member, a cup-shaped cap member revoluble relatively to the base member and formed with a spherical end wall, means for holding the base and cap members from relative movement, a plunger movable within the cap member, and a spindle journaled in the end wall of the cap member and having a shoulder engaging the inner face of the cap member, and a second shoulder having a portion of spherical form turning upon the contiguous surface of said end wall of the cap member, the last-mentioned shoulder being formed with a depending peripheral flange encircling the contiguous upper end of the side wall of the cap member, substantially as and for the purpose described.

11. A lubricator comprising a casing provided with an open upper end, a cap member rotatable relatively to the casing and supported thereby, a cover inclosing the cap member and formed with a closed end wall and a flange encircling the side wall of the cap, a stem extending through the cap and the cover, the stem being rotatable relative to the cover but not rotatable relative to the cap, a plunger carried by the stem, a collar carried by the stem and abutting the inner surface of the cap, and a second collar carried by the stem and abutting the outer surface of the cover, substantially as and for the purpose specified.

12. In a grease cup, the combination with a base member and a cup-shaped cap member detachably connected together by the relative rotation of said members; of yielding means for resisting the relative turning movement of said members, such yielding means being tensioned by said turning movement, an operating cap inclosing the closed end of the cap member and rotatable relatively thereto, the outer surface of the operating cap being of less area than the outer surface of the cap member for exposing a portion of the last-mentioned outer surface to permit engagement thereof, and feeding means within the cap member controlled by the rotation of the operating cap, the feeding means being removable with the cap member when the latter is detached from the base member, substantially as and for the purpose set forth.

13. In a grease cup, the combination with a base member and a cup-shaped cap member detachably connected together by the relative rotation of said members; of yielding means for resisting the relative turning movement of said members, such yielding means being tensioned by said turning movement, two caps, each provided with an end wall and a side wall, the end walls being arranged one above the other, and the side walls being arranged one within the other, the inner side wall being of greater height that the outer side wall and projecting beyond said outer side wall and detachably engaging the base member, the outer side wall and the projecting portion of the inner side wall being provided with hand engaging surfaces, and feeding means within the cap provided with the inner side wall and controlled by the rotation of the cap provided with the outer side wall, said feeding means including a member uniting the end walls of the caps, substantially as and for the purpose described.

14. In a grease cup, the combination of a base portion having internal threads, a cap portion having a cylindrical wall and a top, the wall having external threads near its lower end which screw into the threads of the base portion, a spring detent device for locking the cap to the base portion, said cap having external knurling by which it may be turned, a plunger within the cap, a central screw threaded in the plunger and rotatably journaled in the top of the cap, a supplemental cap seated on the top of the main cap and having a cylindrical wall projecting partway over the cylindrical wall of the main cap, the cylindrical wall of the supplemental cap being externally knurled and the top portion of the supplemental cap being rigidly secured to the screw.

In testimony whereof, I hereunto affix my signature in the presence of two witnesses.

OSCAR ZERK.

Witnesses:
  JUSTIN W. MACKLIN,
  BRENNAN B. WEST.